(12) United States Patent
Isojima (10) Patent No.: US 8,588,798 B2
(45) Date of Patent: Nov. 19, 2013

(54) MOBILE RADIO COMMUNICATION SYSTEM INCLUDING UPLINK RADIO RESOURCE ALLOCATION FUNCTION

(75) Inventor: Katsuaki Isojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 13/087,669

(22) Filed: Apr. 15, 2011

(65) Prior Publication Data

US 2011/0281604 A1   Nov. 17, 2011

(30) Foreign Application Priority Data

May 12, 2010   (JP) .................................. 2010-110291

(51) Int. Cl.
*H04W 72/00*   (2009.01)
(52) U.S. Cl.
USPC .......................................... 455/450; 370/329
(58) Field of Classification Search
USPC ...................................... 455/450, 451, 452.1
See application file for complete search history.

(56) References Cited

U.S. PATENT DOCUMENTS

2010/0111008 A1*   5/2010   Ishii ............................... 370/329

FOREIGN PATENT DOCUMENTS

| JP | 2009-49580 | 3/2009 |
| JP | 2009-159346 | 7/2009 |

OTHER PUBLICATIONS

"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.8.0 (Dec. 2009), Jan. 5, 2010.

"3rd Generation Partnership Project; Technical Specification Group Radio Access Network; Evolved Universal Terrestrial Radio Access (E-UTRA); Multiplexing and channel coding (Release 8)", 3GPP TS 36.212 V8.8.0, Dec. 16, 2009.

3rd Generation Partnership Project; Technical Specification Group Radio Access Network; Evolved Universal Terrestrial Radio Access (E-UTRA); Physical Channels and Modulation (Release 8), 3GPP TS 36.211 V8.9.0, Dec. 16, 2009.

3rd Generation Partnership Project; Technical Specification Group Radio Access Network; Evolved Universal Terrestrial Radio Access (E-UTRA); Physical layer procedures (Release 8), 3GPP TS 36.213 V8.8.0, Sep. 29, 2009.

* cited by examiner

*Primary Examiner* — TU X Nguyen
(74) *Attorney, Agent, or Firm* — Fujitsu Patent Center (57) ABSTRACT

A radio resource allocating method by a radio base station device, includes updating a data resident amount of a management object based on a received report signal when the report signal reports a data resident amount stored in a transmission buffer of a mobile station, estimating a following data resident amount based on the updated data resident amount and a radio resource amount of uplink transmission to be allocated to the mobile station; and determining and reporting the radio resource amount for the uplink transmission from the base station based on the estimated data resident amount.

4 Claims, 8 Drawing Sheets

MOBILE RADIO COMMUNICATION SYSTEM INCLUDING UPLINK RADIO RESOURCE ALLOCATION FUNCTION

CROSS-REFERENCE TO RELATED APPLICATIONS

This application is based upon and claims the benefit of priority from the prior Japanese Patent Application No. 2010-110291 filed on May 12, 2010, the entire contents of which are incorporated herein by reference.

FIELD

The embodiments discussed herein are related to a mobile radio communication system that includes an uplink radio resource allocation function.

BACKGROUND

In recent years, standardization of Long Term Evolution (LTE) as a next generation mobile radio communication technique has been proposed in the 3rd Generation Partnership Project. In this proposal, various techniques for improving frequency utilizing efficiency have been discussed.

To improve the frequency utilizing efficiency, a radio base station device is desired to perform controlling (scheduling) for efficiently allocating an uplink radio resource that is to be used in a data communication between a radio base station device and a mobile station, that is, a resource that may be indicated with a frequency and a time to many mobile stations under control of the radio base station device.

As one of the methods, the mobile station reports a resident amount of data stored in a transmission buffer to the radio base station device, and the radio base station device determines an uplink radio resource amount to be allocated to the mobile station according to the data resident amount. According to this method, a Buffer Status Report is used to report the resident amount of the data stored in the transmission buffer of the mobile station.

The following Patent Document and Non-Patent Documents propose mobile radio communication systems that schedule allocation of the uplink radio resource based on a buffer status report signal:

[Patent Document] Japanese Laid-open Patent Publication 2009-49580
[Non-Patent Document 1] 3GPP TS36.211 Ver8.9.0:3rd Generation Partnership Project Technical Specification Group Radio Access Network Evolved Universal Terrestrial Radio Access (E-UTRA) Physical Channels and Modulation
[Non-Patent Document 2] 3GPP TS36.212Ver8.8.0:3rd Generation Partnership Project Technical Specification Group Radio Access Network Evolved Universal Terrestrial Radio Access (E-UTRA) Multiplexing and channel coding
[Non-Patent Document 3] 3GPP TS36.213Ver8.8.0:3rd Generation Partnership Project Technical Specification Group Radio Access Network Evolved Universal Terrestrial Radio Access (E-UTRA) Physical layer procedures
[Non-Patent Document 4] 3GPP TS36.321Ver8.8.0:3rd Generation Partnership Project Technical Specification Group Radio Access Network Evolved Universal Terrestrial Radio Access (E-UTRA) Medium Access Control (MAC) protocol specification.

SUMMARY

According to an aspect of the invention, a radio resource allocating method by a radio base station device includes updating a data resident amount of a management object based on a received report signal when the report signal reports the data resident amount stored in a transmission buffer of a mobile station, estimating a following data resident amount based on the updated data resident amount and the radio resource amount of uplink transmission to be allocated to the mobile station; and determining and reporting the radio resource amount for the uplink transmission from the base station based on the estimated data resident amount.

The object and advantages of the invention will be realized and attained at least by the elements, features, and combinations particularly pointed out in the claims. It is to be understood that both the foregoing general description and the following detailed description are exemplary and explanatory and are not restrictive of the invention, as claimed.

DESCRIPTION OF THE EMBODIMENTS

An aspect of the present invention is to provide a technique for using a report signal that reports a resident amount of data stored in a transmission buffer of a mobile station to more efficiently allocate an uplink radio resource to the mobile station.

To achieve the aspect, a radio resource allocating method performed by a radio base station device includes updating the data resident amount as a management object based on the received report signal when receiving the report signal reports the data resident amount stored in the transmission buffer of the mobile station, estimating a following data resident amount based on the updated data resident amount and the radio resource amount for uplink transmission to be allocated to the mobile station, and determining and reporting the radio resource amount to be allocated so that the uplink transmission from the mobile station is performed based on the estimated data resident amount.

According to the disclosed method, the uplink radio resource may be allocated to the mobile station more efficiently.

Detailed description will be made with reference to the attached figures. Embodiments are illustrated in the figures. However, various forms are applicable in the present invention, and the embodiments are not limited to the embodiments described in the present specification.

Figure 1:
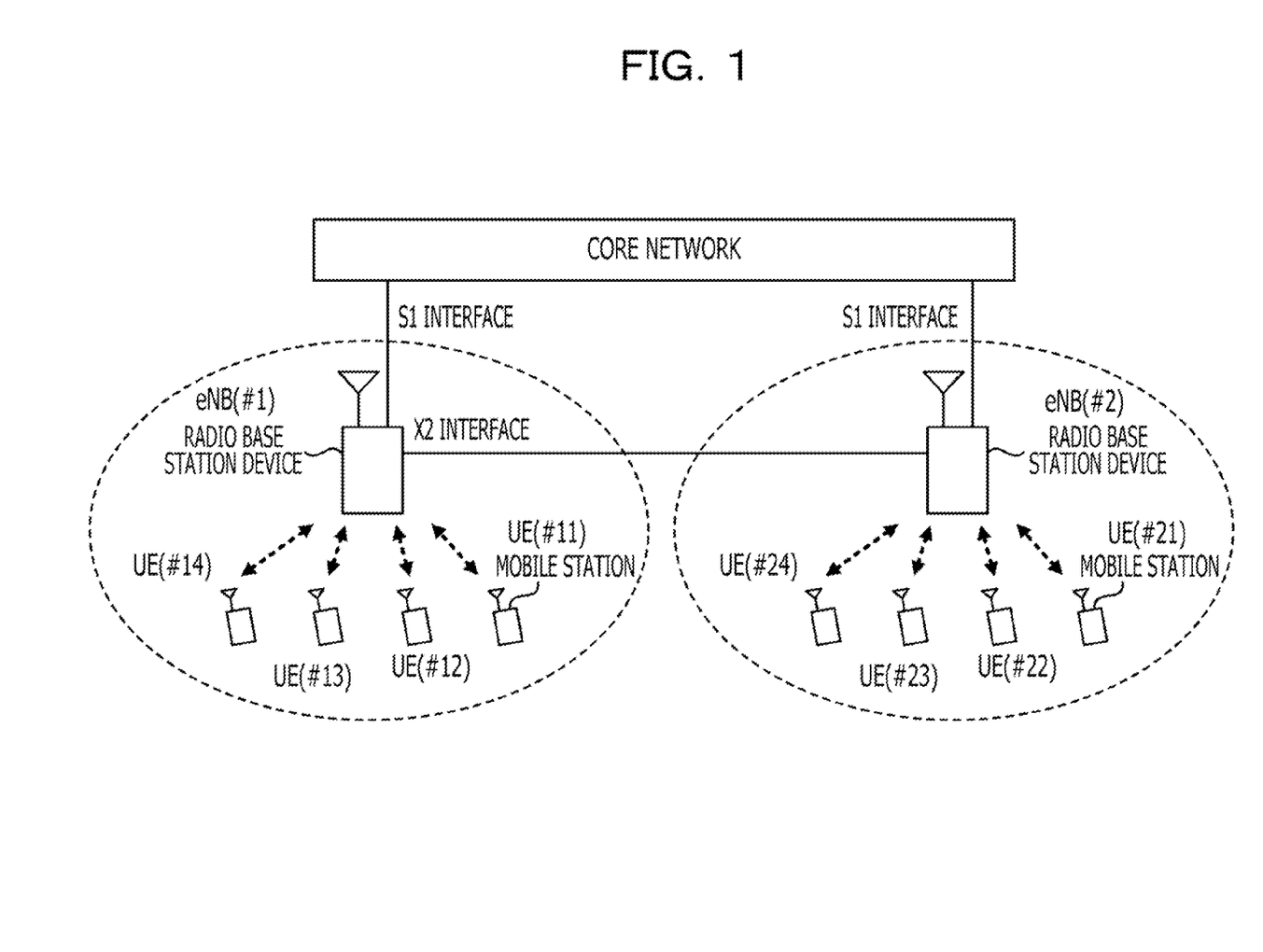
FIG. 1 is a block diagram illustrating a configuration of a mobile radio communication system according to an embodiment.

[Mobile radio communication system] With reference to FIG. 1 illustrating a configuration of a system according to an embodiment, a mobile radio communication system SYS includes a plurality of radio base station devices eNB (evolved Node B) (#1, #2), a plurality of mobile stations UE (User Equipment) (#11 to #14, #21 to #24) as a radio terminal used by a user, and a Core Network CN as a high-order wired network.

In the mobile radio communication system SYS, the radio base station devices eNB (#1, #2) are coupled to the core network CN by an S1 interface, respectively. The radio base station devices eNB (#1, #2) are coupled with each other by an X2 interface. The S1 interface and the X2 interface are on a wired transmission line. The radio base station devices eNB (#1, #2) communicate with a plurality of mobile stations UE (#11 to 14, #21 to #24) under control of the radio base station device by a prescribed radio connection technique, respectively.

A Down Link signal in a direction toward each mobile station UE from each radio base station device eNB is an Orthogonal Frequency Division Multiple Access (OFDMA) signal. An Up Link signal in a direction toward each mobile station UE from each radio base station device eNB is a Single Carrier-Frequency Division Multiple Access (SC-FDMA) signal.

Figure 2:
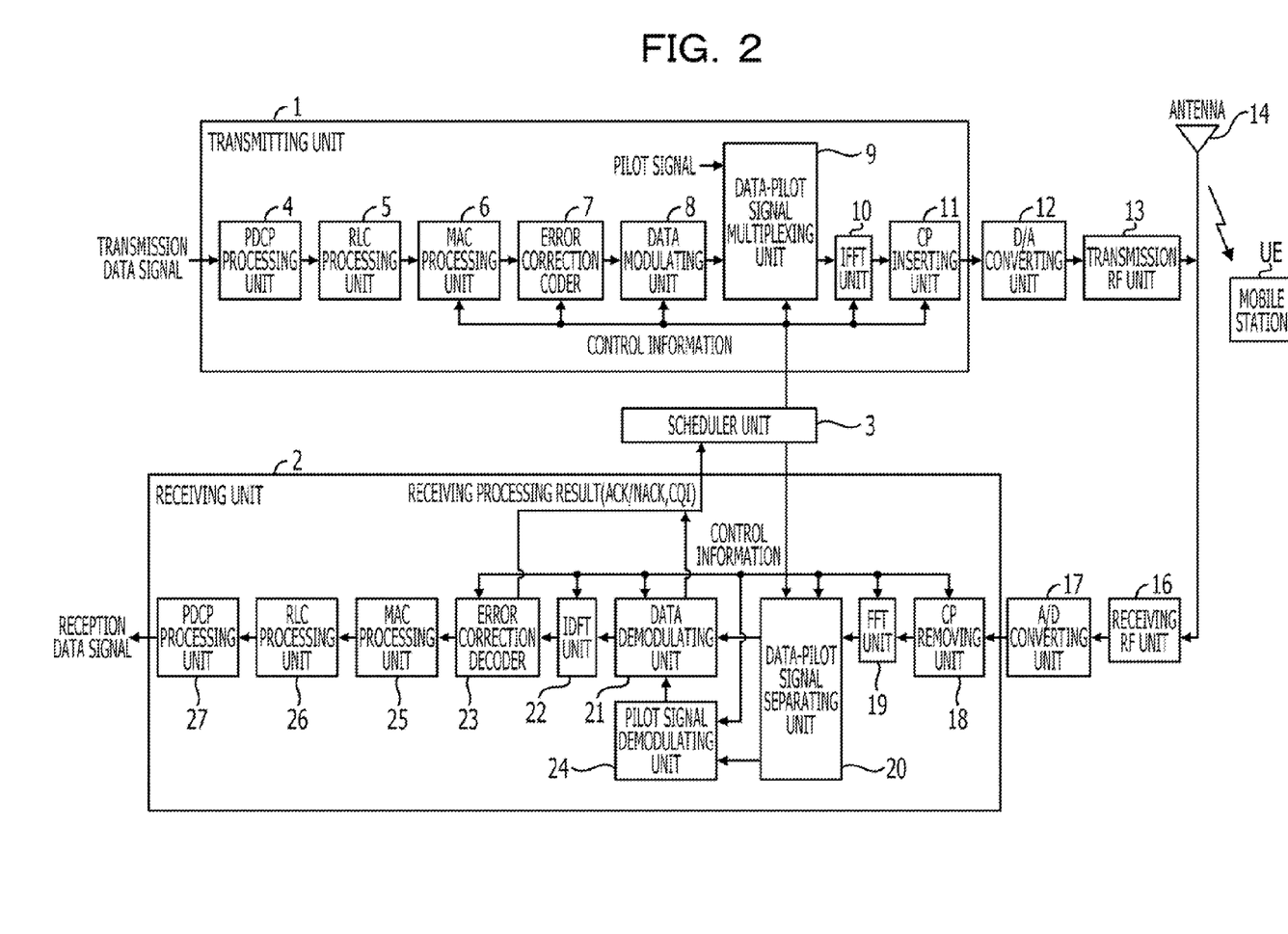
FIG. 2 is a block diagram illustrating a configuration of a radio base station device applicable to the mobile radio communication system according to the embodiment.

[Radio base station device] FIG. 2 illustrates a detailed configuration of each radio base station device eNB in the mobile radio communication system SYS according to the embodiment illustrated in FIG. 1.

As illustrated in FIG. 2, the radio base station eNB includes a transmitting unit 1 that performs processing on a Down Link signal, a receiving unit 2 that performs processing on an Up Link signal, and a scheduler unit 3 that selects a mobile station UE as a communication object and manages (controls) allocation of the radio resource. A CPU (Central Processing Unit), DSP (Digital Signal Processor) or the like provides functions executed by the scheduler unit 3.

Figure 3:
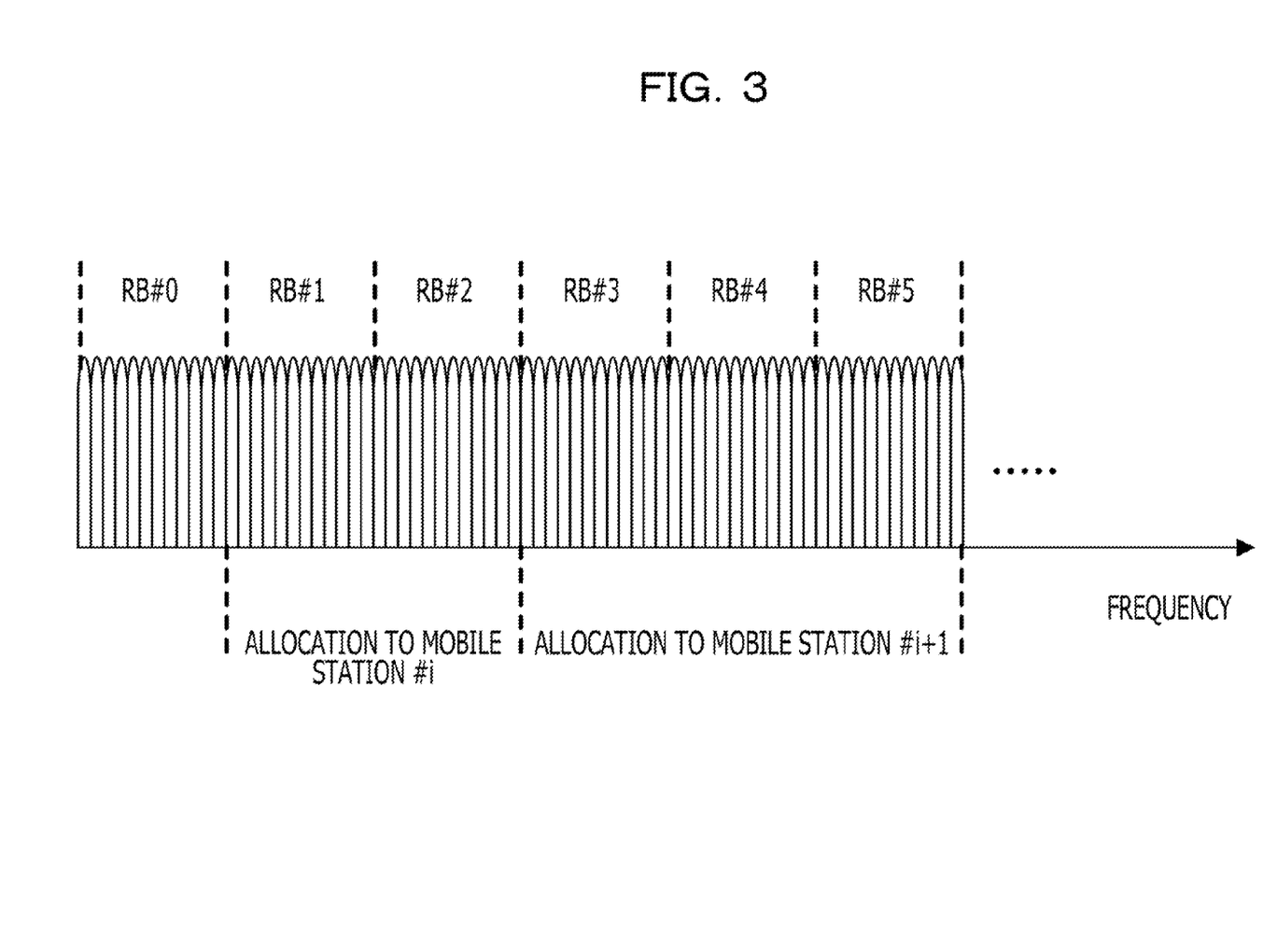
FIG. 3 is a diagram illustrating a radio resource in the mobile radio communication system according to the embodiment.

For example, in Long Term Evolution (LTE), 12 adjacent subcarriers to be transmitted in a radio zone are regarded as one group and defined to be a Resource Block (RB). For each of 10 subframes included in a radio frame, the scheduler unit 3 in the radio base station device eNB determines a frequency band to be allocated by resource block RB unit to each of the mobile stations UE under control of the radio base station device eNB. In the example illustrated in FIG. 3, resource blocks RB#1 and RB #2 are allocated to a mobile station UE#i (i is an integer larger than 1), and resource blocks RB#3, RB#4, and RB#5 are allocated to the mobile station UE#i+1.

According to a set (a modulation format) of a combination of a modulating method and a coding rate, the transmitting unit 1 performs processing on the transmission data signal to be transmitted to the mobile station UE as a communication object determined by the scheduler unit 3. In this case, the transmitting unit 1 generates and transmits an Orthogonal Frequency Division Multiplexing (OFDM) signal by multi-carrier modulation.

In the transmitting unit 1, a Packet Data Convergence Protocol (PDCP) processing unit 4 converts a PDCP Service Data Unit (SDU) as the transmission data signal received from a wired transmission line into a PDCP Protocol Data Unit (PDU) and then transfers the PDCP PDU to a Radio Link Control (RLC) processing unit 5. The RLC processing unit 5 receives the received data signal as a RLC SDU, converts the data into an RLC PDU, and transfers the RLC PDU to a Medium Access Control (MAC) processing unit 6. The MAC processing unit 6 receives the received data signal as a MAC SDU, converts the MAC SDU into a MAC PDU, and transfers the MAC PDU to an error correction coder 7.

The error correction coder 7 codes the received data signal by performing error correction coding processing. A data modulating unit 8 performs data modulation (for example, subcarrier modulation by QPSK) on the coded data signal from the error correction encoding 7. A data-pilot signal multiplexing unit 9 time-multiplexes the modulated data signal and a known pilot signal (a reference signal) in the mobile station UE as a reception station.

An Inverse Fast Fourier Transform (IFFT) unit 10 performs the OFDM modulation by the IFFT calculation by a sample unit of a certain number N. That is, N pieces of data samples are regarded as subcarrier signal components. The subcarrier components are subjected to the IFFT calculating processing and converted into discrete time signals to be output.

Among the N samples subjected to the IFFT calculation processing, a Cyclic Prefix (CP) inserting unit 11 copies M samples (N>M) in a latter part and inserts the M samples as a CP in the head of the N samples. Since the CP is cyclically copied, the signal continues in a section of the M+N samples after the insertion of the CP. Due to this characteristic, the CP plays a role in removing interference caused by a delay symbol from an adjacent path.

A Digital/Analog (D/A) conversion unit 12 converts a digital signal, which is added with the CP as a guard interval (GI) and input from the CP inserting unit 11 in the transmitting unit 1, into an analog signal. After converting the analog signal into a radio frequency (RF) signal, a transmitting RF unit (an analog radio transmitter) 13 transmits the RF signal to the mobile station UE through an antenna 14.

The receiving unit 2 performs processing on a reception data signal that is transmitted from the mobile station UE determined by the scheduler unit 3. For example, in the LTE, SC-FDMA is employed as a radio connection technique to perform Up Link (UL) data transmission. Regarding an OFDM modulation wave, a Peak to Average Power Ratio is large. Thus, it is inevitable that the efficiency of the transmission amplifier of the mobile station UE is reduced, the maximum transmission power is decreased, or the power consumption is increased. This problem is reduced by employing the SC-FDMA.

After being subjected to Single-Carrier Frequency Division Multiplexing (SC-FDM) by single carrier modulation and being received by the antenna 14, the RF signal is converted into an analog signal by a receiving RF unit (an analog radio transmitter) 16 and is then converted into a digital signal by an Analog/Digital (A/D) converting unit 17.

The signal digital-converted by the A/D converting unit 17 is transmitted through a CP removing unit 18, a Fast Fourier Transform (FFT) unit 19, a data-pilot signal separating unit 20, a data demodulating unit 21, an Inverse Discrete Fourier Transform unit 22, and an error correction decoder 23 in the receiving unit 2, respectively, and is SC-FDM modulated and data-modulated.

In the data demodulating processing, after being separated by the data-pilot signal separating unit 20, the pilot signal multiplexed with the data signal is subjected to the demodulating processing by a pilot signal demodulating unit 24. Based on a demodulation result of the pilot signal, the data demodulating unit 21 performs demodulating processing on the data signal.

The demodulated data signal is transferred from the error correction decoder 23 to a MAC processing unit 25. The MAC processing unit 25 receives the data signal as the MAC PDU, converts the MAC PDU into the MAC SDU, and transfers the MAC SDU to an RLC processing unit 26. The RLC processing unit 26 receives the data as the RLC PDU, converts the RLC PDU into the RLC SDU, and transfers the RLC SDU to a PDCP processing unit 27. The PDCP processing unit 27 receives the data signal as the PDCP PDU, converts the PDCP PDU into the PDCP SDU, and performs data transmission via a wired transmission line.

The scheduler unit 3 included in the control unit that controls the radio base station device eNB transmits control information to the transmitting unit 1, which performs transmitting processing on the Down Link signal, and to the receiving unit 2, which performs receiving processing on the Up Link signal, inputs down link reception state information (Channel Quality Indicator (CQI)) and ACK/NACK as a receiving processing result from the data demodulating unit 21 and the error correction decoder 23 in the receiving unit 2, selects a mobile station UE as a communication object, and controls allocation or the like of the radio resource. The allocating processing of the uplink radio resource by the scheduler unit 3 will be described below.

Figure 4:
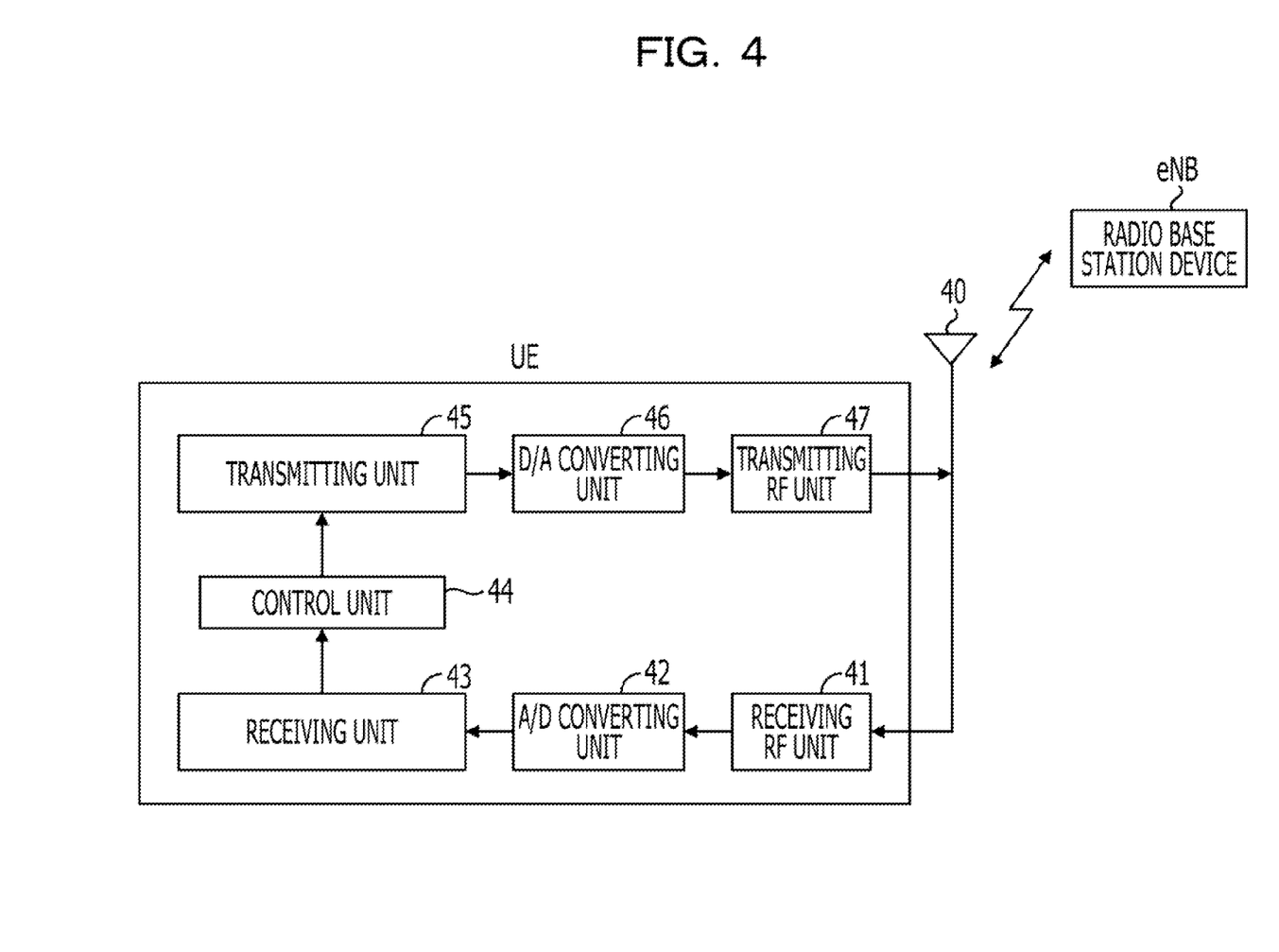
FIG. 4 is a block diagram illustrating a configuration of a mobile station applicable to the mobile radio communication system according to the embodiment.

[Mobile station] FIG. 4 illustrates a detailed configuration of each mobile station UE in the mobile radio communication system SYS according to the embodiment illustrated in FIG. 1.

As illustrated in FIG. 4, the analog RF signal subjected to the OFDM modulation is transmitted from the radio base station device eNB, received by the antenna 40, and converted into an analog signal by a receiving RF unit (an analog radio receiver) 41. This analog signal is converted into a digital signal by an A/D converting unit 42.

The digital-converted signal is transmitted to the receiving unit 43 and is then subjected to baseband processing that includes the OFDM demodulation. A result of the data modulation and the data decoding in the receiving unit 43 is transmitted to a control unit 44. According to the received various control information, the control unit 44 directs a transmitting unit 45 to perform the transmitting processing.

At a time directed by the control unit 44, the data signal and various control information, which are SC-FDM modulated by the transmitting unit 45, are converted into an analog signal by a D/A converting unit 46. The analog signal is converted into an analog RF signal by a transmitting RF unit (an analog radio transmitter) 47 and is then transmitted to the radio base station device eNB through the antenna 40.

The control unit 44 that controls the radio terminal UE measures the resident amount of the data stored in the transmission buffer in the transmitting unit 45 (not illustrated) and generates a Buffer Status Report (BSR) signal to report the data resident amount. The control unit 44 generates a Scheduling Request (SR) signal and Down Link reception status information.

[Uplink radio resource allocating processing] FIG. 1 illustrates an example of Uplink radio resource allocating processing by the radio base station device eNB that is applicable to the mobile radio communication system SYS according to the embodiment illustrated in FIG. 1.

To perform an uplink data communication between the radio base station device eNB and the mobile station UE, the radio base station device eNB determines the Up Link (UL) radio resource by which user data is transmitted at reception of a Scheduling Request (SR) transmitted from the mobile station UE as a trigger.

In this case, the UL radio resource is defined to correspond to a Transport Block Size (TBS) determined based on the number of RBs allocated for the signal transmission on the Physical Uplink Shared Channel (PUSCH) to the mobile station UE and on a Modulation and Coding Scheme (MCS) as the set (a modulation format) of the combination of the modulating method and the coding rate. Specifically, if RB number=20 and MCS=6, TBS=261 byte is the UL radio resource amount.

Figure 5:
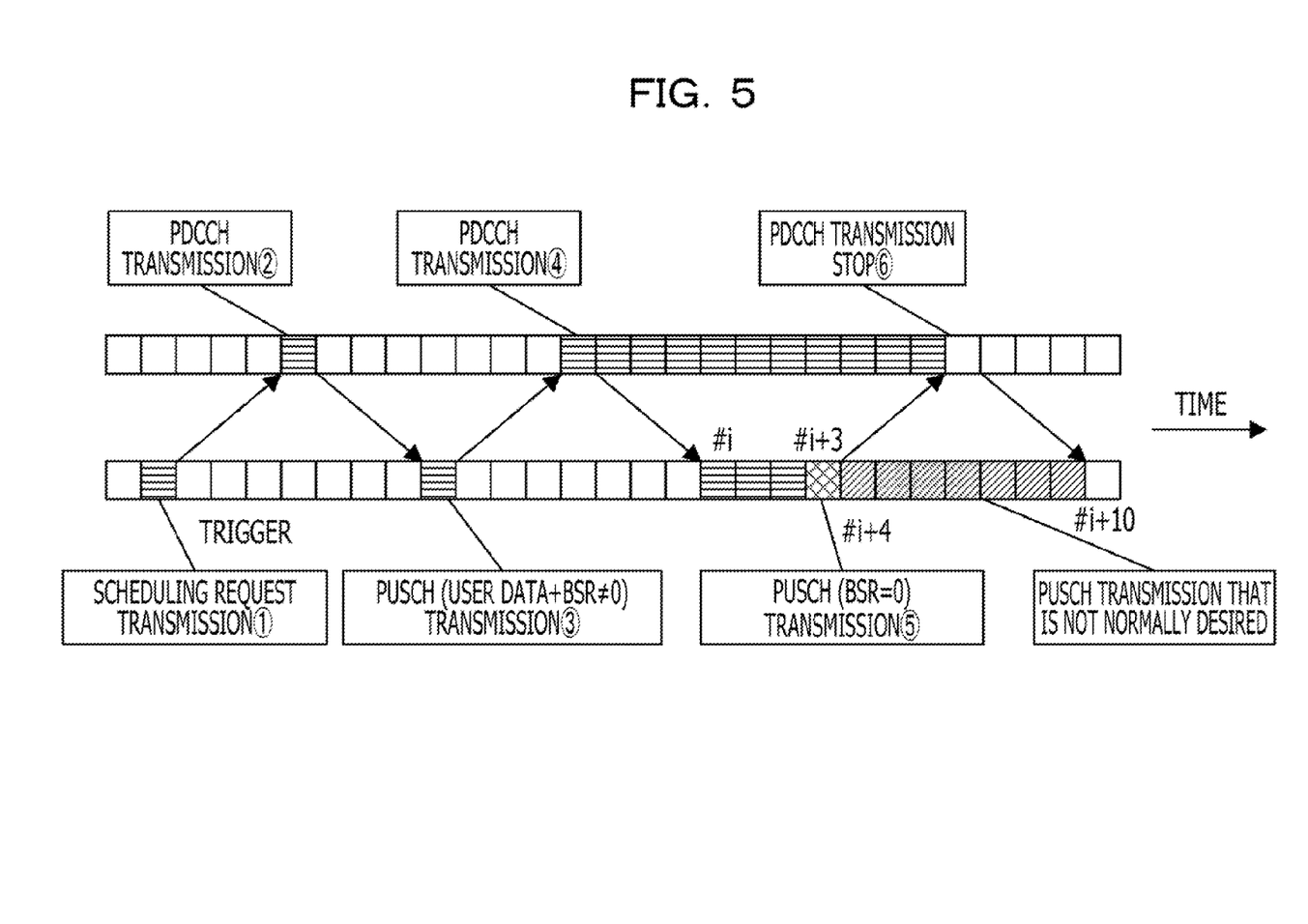
FIG. 5 is a processing sequence between the radio base station device and the mobile station when a scheduling request signal is regarded as a trigger.

If the radio base station device eNB employs the above-described method of determining and reporting the UL radio resource by which the user data is transmitted at a reception, as a trigger, of the scheduling request signal SR transmitted from the mobile station UE, processing between the radio base station device eNB and the mobile station UE is performed in the sequence illustrated in FIG. 5.

Operation 1: The mobile station UE transmits the scheduling request signal SR as a UL data transmission request to the radio base station device eNB on a Physical Uplink Control Channel (PUCCH). In this case, for the mobile station UE, the PUCCH as the UL radio resource for transmission of the scheduling request signal SR is previously allocated based on a known technique.

Operation 2: After receiving the scheduling request signal SR, the radio base station device eNB selects and determines the PUSCH as the UL radio resource (frequency-time resource) that may be used in the scheduler unit 3 with respect to the mobile station UE, and reports the determined UL Allocation Grant on a Physical Downlink Control Channel (PDCCH).

Operation 3: After receiving the UL Allocation Grant on the PDCCH, the mobile station UE transmits a signal on the PUSCH as the UL radio resource according to report contents. In this case, the signal transmitted on the PUSCH may include a Buffer Status Report (BSR), as control information other than the used data, used to report the data resident amount stored in the transmission buffer of the mobile station UE.

Operation 4: After receiving the user data and the BSR on the allocated PUSCH from the mobile station UE, the radio base station device eNB refers to the contents of the BSR, BSR is not 0, and may determine the UL radio resource amount to be allocated next. Based on this result, the radio base station device eNB retransmits the radio resource allocation information on the PDCCH. The transmission of the radio resource allocation information on the PDCCH is maintained for each subframe until the UL radio resource is determined to be stopped with respect to the mobile station UE.

Operation 5: The radio base station device eNB may employ a method of stopping the UL radio resource if the content of the buffer status report signal transmitted from the mobile station UE is BSR=0, that is, if there is no data resident amount, as a condition of stopping the UL radio resource allocated to the mobile station UE.

The mobile station UE receives the radio resource allocation information for allocating the UL radio resource on the PDCCH from the radio base station device eNB. If there is no user data to be transmitted in the transmission buffer, the mobile station UE transmits BSR=0+padding data as the buffer status report signal BSR on the PUSCH #i+3.

Operation 6: If the buffer status report signal BSR (BSR=0) is received, the radio base station device eNB stops the allocation of the UL radio resource to the mobile station UE.

According to the stopping method, a time lag is generated until the radio base station device eNB stops the allocation of the UL radio resource in operation 6 after the mobile station UE transmits the buffer status report signal BSR (BSR=0) in operation 5. It is inevitable that the time lag is further increased in consideration for internal processing delay by the radio base station device eNB. As a result, the PUSCH #i+4 to #i+10 of the allocated UL radio resource are not typically used, so that the utilizing efficiency of the UL radio resource may not be improved in the actual radio communication environment where a plurality of mobile stations UE is present.

Accordingly, the scheduler unit 3 of the radio base station device eNB performs the following UL radio resource allocating processing (scheduling processing).

Figure 6:
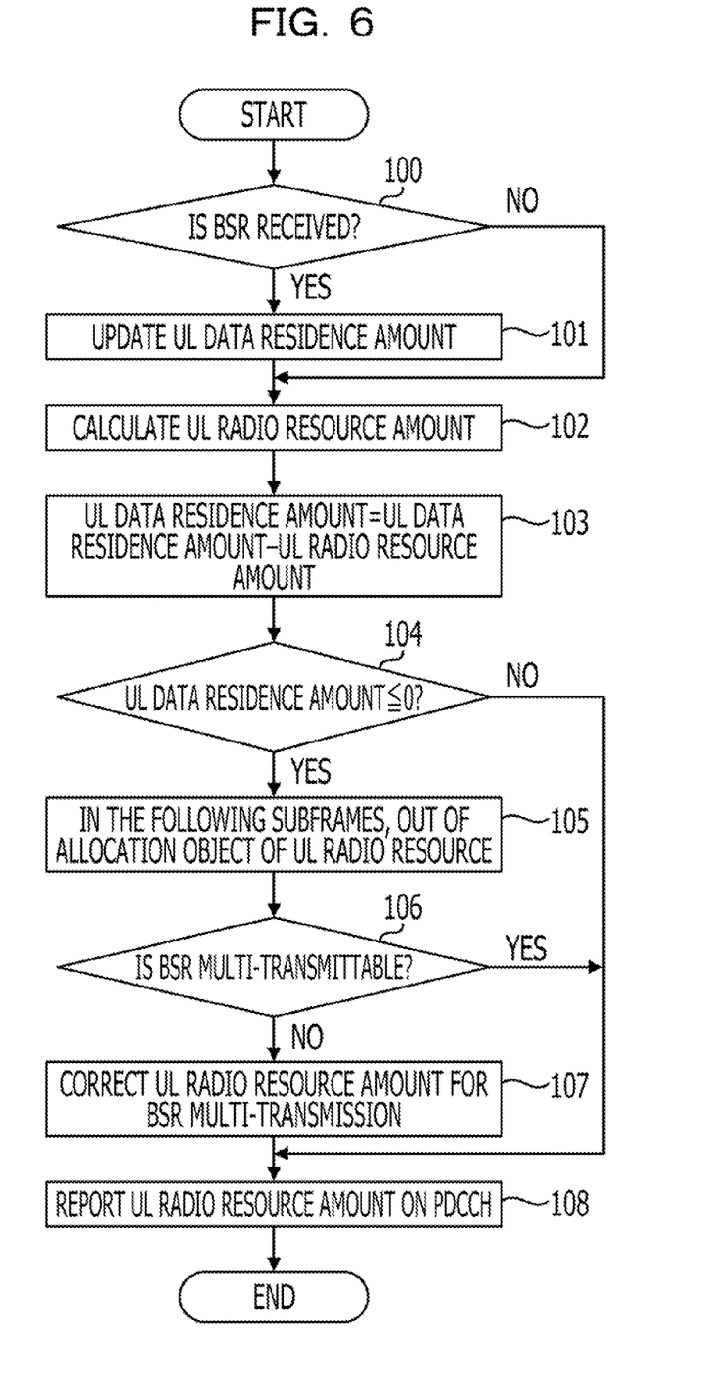
FIG. 6 is a processing flowchart of determining an uplink radio resource amount to be allocated to the mobile station.
Figure 7:
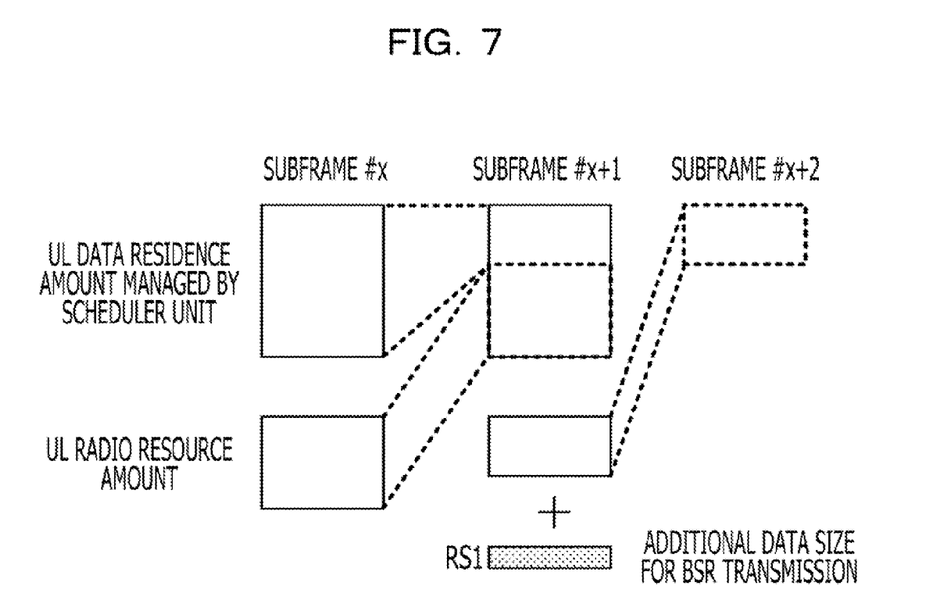
FIG. 7 is a diagram illustrating a concept of the uplink radio resource amount to be allocated to the mobile station.

In operation 4 illustrated in FIG. 5, the following processing is performed to determine the UL radio resource amount to be allocated to the mobile station UE. FIG. 6 is a flowchart of determining processing of a UL radio resource amount to be allocated. FIG. 7 is a concept diagram of UL radio resource amount allocation in the processing.

Operation 100: At a processing time corresponding to operation 4, a determination is made to determine whether or not the buffer status report signal BSR is received from the mobile station UE.

Operation 101: Based on the received buffer status report signal BSR, the UL data resident amount of the mobile station UE managed by the scheduler unit 3 is updated.

Specifically, if the index value in the buffer size reported by the buffer status report signal BSR is "31," the maximum value 1,132 byte is updated as the UL data resident amount. The UL data resident amount of the mobile station UE managed by the scheduler unit 3 corresponds to the UL data resident amount in a subframe #x illustrated in FIG. 7.

Operation 102: The UL radio resource amount to be allocated to the mobile station UE is calculated. Specifically, if RB number=24 and I_MCS=16 are allocated, 903 bytes is calculated as the UL radio resource amount. This UL radio resource amount corresponds to the UL resource amount in the subframe #x illustrated in FIG. 7.

Operation 103: The data amount to be transmitted by the UL radio resource amount is subtracted from the UL data resident amount updated by the operation 101 and is updated as the UL data resident amount at a processing timing after the next subframe.

The updating processing is performed without waiting for a confirmation of transmission completion on the PUSCH corresponding to the PDCCH to which the UL radio resource amount is reported. This may improve the use efficiency of the UL radio resource. For example, in the subframe #x in FIG. 7, if UL data resident amount=1,132 bytes and UL radio resource amount=903 bytes, the UL data resident amount in the following subframe #x+1 is proceeded in 1,132 bytes-903 bytes=229 bytes.

Operation 104: A determination is performed to determine whether the UL data resident amount calculated in the operation 103 is equal to or smaller than "0." If the UL data resident amount is larger than "0," the process goes to operation 108.

Operation 105: If the UL data resident amount is equal to or smaller than "0," the mobile station UE in the following subframes is out of the allocation object of the UL radio resource amount. This processing completes the allocation of the UL radio resource amount for the UL data resident amount and reduces undesired use of the UL radio resource.

Operation 106: The buffer status report signal BSR is determined whether or not to be multi-transmittable in the UL radio resource amount allocated in the subframe.

Specifically, to transmit a short BSR as a buffer status signal BSR, MAC subheader (1 byte)+MAC control element size (1 byte)=2 bytes is desired. If UL data resident amount=229 bytes and UL radio resource amount=256 bytes, the short BSR may be determined to be multi-transmittable. If the BSR multi-transmission is possible, the process goes to the operation 108. If not, the process goes to the operation 107.

Operation 107: If the BSR multi-transmission is impossible, the UL radio resource amount is corrected to make the BSR multi-transmission possible. By this correcting processing, the BSR is intentionally multi-transmitted.

For example, in the subframe #x+1 illustrated in FIG. 7, if UL data resident amount=256 bytes and UL radio resource amount=256 bytes, the UL radio resource amount is corrected to be the amount added with the size of the short BSR. In this case, the size of the short BSR corresponds to the RS1 of the UL radio resource amount in the subframe #x+1 illustrated in FIG. 7. For this correction, the RB number or the I_MCS is increased.

Operation 108: The determined UL radio resource amount is reported to the mobile station UE on the PDCCH.

Figure 8:
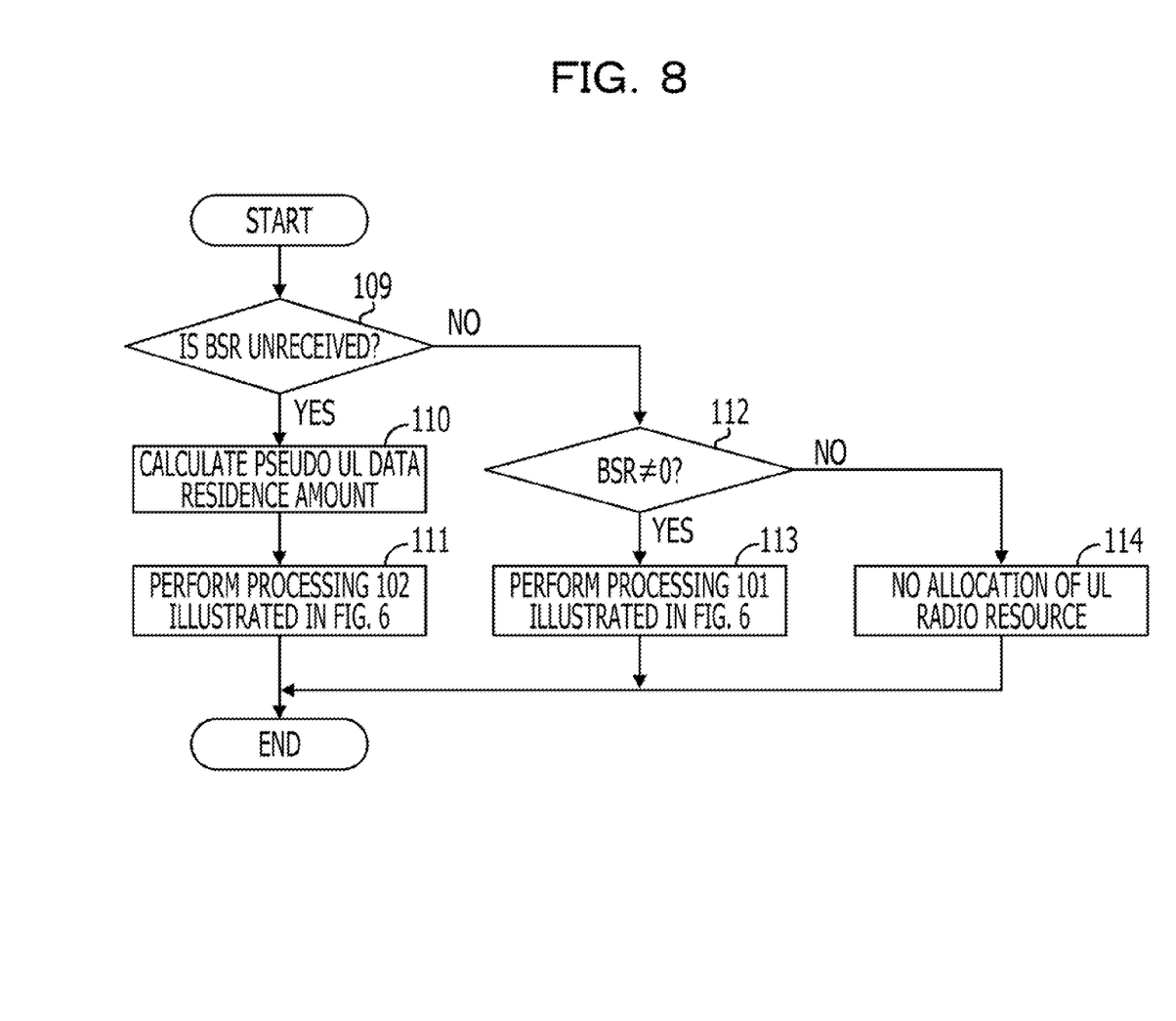
FIG. 8 is a processing flowchart of a reception timing of a PUSCH corresponding to a PDCCH that is subjected to operation 107 from operation 104 and is then reported by operation 108 illustrated in FIG. 6.

The scheduler unit 3 of the radio base station device eNB performs the processing illustrated in FIG. 8 at a receiving timing of the PUSCH corresponding to the PDCCH passed from operation 104 to operation 107 and reported by operation 108 illustrated in FIG. 6.

Operation 109: The buffer status report signal BSR is determined to be not received or not based on the PUSCH. If the BSR is not received, the process goes to operation 110. If the BSR is received, the process goes to operation 112.

Operation 110: The BSR unreceived status means that the user data to be transmitted still remains in the mobile station UE, so that the UL radio resource is desired to be allocated continuously. Accordingly, the scheduler unit 3 calculates a pseudo UL data resident amount.

The pseudo UL data resident amount may be determined based on an Average Data Rate (ADR) of the mobile station UE, the most recently received BSR value, and the number of other mobile stations controlled by the radio base station device eNB.

(a) If ADR=100 bytes/Transmission Time Interval (TTI), the value 100×CA byte, which is multiplied by the coefficient CA according to a Priority Class or the like, is updated as the UL data resident amount.

(b) The data size corresponding to the index value in the buffer size reported by the most recently received BSR, for example, the value 1,132×CB bytes, which is multiplied by the coefficient CB according to a priority class or the like, is updated as a UL data resident amount.

(c) The above-described UL data resident amounts (a) and (b) are compared. The smaller size is updated as the UL data resident amount.

Operation 111: Based on the pseudo UL data resident amount calculated in the operation 110, the operation 102 illustrated in FIG. 6 is firstly performed.

Operation 112: In the BSR reception status, the received BSR value is determined to be "0" or not. If the received BSR value is not "0," the process goes to operation 113. If the received BSR value is "0," the process goes to operation 114.

Operation 113: Operation 101 illustrated in FIG. 6 is performed by using the received BSR.

Operation 114: Since there is no user data to be transmitted in the mobile station UE, reallocation of the UL radio resource is not performed.

Deformed Example

The processing according to the above-described embodiment is provided as a program that may be executed in a computer and may be provided through a recording media such as a CD-ROM and a flexible disk, or even through a communication line.

Each of the processing according to the above-described embodiments may be performed by selecting to combine some or all of the processing.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A radio resource allocating method by a radio base station device, comprising:
    updating a data resident amount of a management object based on a received report signal when the report signal reports the data resident amount stored in a transmission buffer of a mobile station,
    estimating a following data resident amount based on the updated data resident amount and a radio resource amount of uplink transmission to be allocated to the mobile station;
    determining and reporting the radio resource amount for the uplink transmission from the base station based on the estimated data resident amount;
    stopping allocation of the radio resource amount to the mobile station when the data resident amount is determined to be zero; and
    correcting and reporting, when the allocation is stopped, the radio resource amount when multi-transmission of the report signal and user data is determined to be impossible so that the report signal may be multi-transmittable.

2. The radio resource allocating method according to claim 1, wherein if the report signal is not received, the radio resource allocating method further comprises:
    calculating a pseudo data resident amount; and
    continuing the allocation of the radio resource amount to the mobile station.

3. A radio base station device comprising:
    a processor;
    a receiver in communication with the processor, the radio base station device allocates an uplink radio resource if the radio base station device receives a report signal which reports a data resident amount stored in a transmission buffer of a mobile station,
    the radio base station device updates the data resident amount as a management object based on the received report signal, estimates the following data resident amount based on the radio resource amount for uplink transmission to be allocated to the mobile station, and determines and reports the radio resource amount to be allocated for the uplink transmission from the mobile station based on the estimated data resident amount,
    the processor stops allocation of the radio resource amount to the mobile station when the estimated data resident amount is determined to be zero and corrects and reports the radio resource amount to be allocated when the allocation is stopped so that the report signal may be multi-transmittable if multi-transmission of the report signal and the user data is determined to be impossible.

4. The radio base station according to claim 3, wherein, if the report signal is not received, the processor calculates a pseudo data resident amount and continues allocating the radio resource amount to the mobile station.

* * * * *